United States Patent [19]

Glicksman et al.

[11] Patent Number: 5,032,439
[45] Date of Patent: Jul. 16, 1991

[54] THERMAL INSULATIONS USING VACUUM PANELS

[75] Inventors: Leon R. Glicksman, Lynnfield, Mass.; Melissa S. Burke, Pittsburgh, Pa.

[73] Assignee: Massachusetts Institute of Technology, Cambridge, Mass.

[21] Appl. No.: 398,788

[22] Filed: Aug. 25, 1989

[51] Int. Cl.$^5$ ............................ B32B 3/12; B32B 3/10
[52] U.S. Cl. ........................................ 428/44; 428/69; 428/72; 428/76; 428/318.4
[58] Field of Search .................... 428/69, 72, 76, 44

[56] References Cited

U.S. PATENT DOCUMENTS

| 3,991,531 | 11/1976 | Becker | 52/173 R |
|---|---|---|---|
| 4,159,359 | 6/1979 | Pelloux-Gervais et al. | 428/76 |
| 4,304,824 | 12/1981 | Karpinski | 428/69 |
| 4,399,175 | 8/1983 | Kummermehr et al. | 428/76 |
| 4,425,413 | 1/1984 | Ziegenbein et al. | 429/112 |
| 4,492,725 | 1/1985 | Ishihara et al. | 428/69 |
| 4,505,977 | 5/1985 | Hasenauer et al. | 428/363 |
| 4,529,638 | 7/1985 | Yamamoto et al. | 428/69 |
| 4,531,511 | 7/1985 | Hochberg | 126/450 |
| 4,579,756 | 4/1986 | Edgel | 428/34 |
| 4,636,415 | 1/1987 | Barito et al. | 428/68 |
| 4,668,555 | 5/1987 | Uekado et al. | 428/69 |
| 4,681,788 | 7/1987 | Barito et al. | 428/68 |
| 4,683,154 | 7/1987 | Benson et al. | 428/34 |
| 4,798,753 | 1/1989 | Abuaf et al. | 428/69 |

FOREIGN PATENT DOCUMENTS

90/04864 1/1991 European Pat. Off. .
1271070 4/1972 United Kingdom .

OTHER PUBLICATIONS

"Advanced Evacuated Thermal Insulations: The State of the Art", by H. Alan Fine, 6/15/88, pp. 1–38.
"Flat Panel Vacuum Thermal Insulation", Strong et al., *Journal of Applied Physics*, vol. 31, No. 1, Jan. 1960, pp. 39–50.
"Development of Advanced Thermal Insulation for Appliances", Progress Report for the Period Jul. 1984 through Jun. 1985, Yarbrough et al., May 1986.
"The Thermal Resistance of Perlite-Based Evaluated Insulations for Refrigerators", Yarbrough et al., Sep. 1986.

Primary Examiner—Alexander S. Thomas
Attorney, Agent, or Firm—Hamilton, Brook, Smith & Reynolds

[57] ABSTRACT

Thermal insulation vacuum panels are formed of an inner core of compressed low thermal conductivity powders enclosed by a ceramic/glass envelope evaluated to a low pressure.

6 Claims, 3 Drawing Sheets

THERMAL INSULATIONS USING VACUUM PANELS

BACKGROUND OF THE INVENTION

The Government has rights in this invention pursuant to Subcontract Number 19X-09099C awarded by the Department of Energy.

The most efficient insulation used in buildings and appliances is closed cell foam polyurethane, polyisocyanerate or phenolic insulation. When new, this insulation has over twice the insulating value per inch of thickness as does fiberglass insulation. Substantially, all commercial refrigerators made today in the U.S. use closed cell foam for the surfaces; save the doors. About seven million refrigerators are sold in the U.S. every year. One-third of the interior volume of a refrigerator is foam insulation. Industry representatives estimate that reducing insulation volume by one cubic foot would be worth $50.

About one-half of the buildings constructed in the U.S. use closed cell foam for roof or wall insulation. Use of boards made of foam as exterior sheathing is the most practical way $2 \times 4$ framed construction can meet the current energy standards.

Closed cell foam has excellent insulating characteristics because it contains chlorofluorocarbon (CFC) vapor within the cells. The CFC vapor has a thermal conductivity which is one-third that of air. Unfortunately, it has been found that this CFC causes depletion of the stratospheric ozone layer. The U.S. and other developed nations have agreed to phase out the use of CFC over the next decade. Replacement refrigerant vapors are not available at present. Replacements being considered have not completed toxicity tests, have higher projected costs and higher thermal conductivity, and there is little manufacturing capability in place for these replacements.

All of the above factors favor the development of alternate insulations which are inexpensive and have insulating values per unit thickness equal to or exceeding that of present day closed cell foams. One such concept is vacuum thermal insulation. Vacuum insulations have been used for thermos-type containers and for vessels containing cryogenic fluids. These are vacuums made with rigid wall containers which have a high reflectivity surface to reduce radiation heat transfer. These insulations are expensive and fragile.

Recent interest has centered on vacuum panels made with flexible surfaces. In Uekado et al., U.S. Pat No. 4,668,555, the panel is formed of evacuated foam insulation within a metal-plastics laminate film envelope. In another system, the panels are filled with lightly compressed blocks of fine powder. The powder is covered with a flexible plastic skin or packaging coated with thin metallic layers which prevent air diffusion. When the interior of the panel is evacuated to a modest vacuum, e.g., one mm Hg pressure, the effective conductivity of the powder is found to have one-third to one-fifth the conductivity of the best closed cell foam insulation. The powder also supports the skin so that it does not collapse when it is evacuated.

SUMMARY OF THE INVENTION

The problem with such systems is the presence of pin holes, or gaps, in the metallic-plastic layers which allow air to enter the panel. As the air pressure in the panel rises, the insulating performance drops off dramatically. Use of thicker metal foils to prevent pin holes causes a secondary problem. Since the metal is a good conductor of heat, appreciable heat is transferred around the foil surface, bypassing the vacuum space.

The deficiencies summarized above may be overcome by the present invention. In accordance with the present invention, evacuated insulation panels are formed by enclosing in an evacuated envelope lightly compressed fine powder formed of low thermal conductivity materials. The envelope is also comprised of low thermal conductivity, low gas permeable ceramic material, such as glass or other ceramics in continuous layers. Optionally, the panels thus formed may be enclosed in an outer protective enclosure of low thermal conductivity lightweight material, such as open-cell foam.

The low-thermal conductivity envelope reduces the opportunity for heat to bypass the evacuated envelope and the foam enclosure protects the envelope surface from abrasion or sharp objects.

The ceramic envelope can be preformed in the shape of the powder as it is manufactured, or it can initially be in continuous sheet form, powder or non-woven fiber form, or it can be placed over the compressed powder, heated to softening, and formed around the powder by evacuating the powder while the hot film envelope is being formed in place around the powder.

An array of N rows and M columns of such panels can be formed so that damage to one does not substantially degrade overall performance.

DETAILED DESCRIPTION OF THE INVENTION

Figure 1:
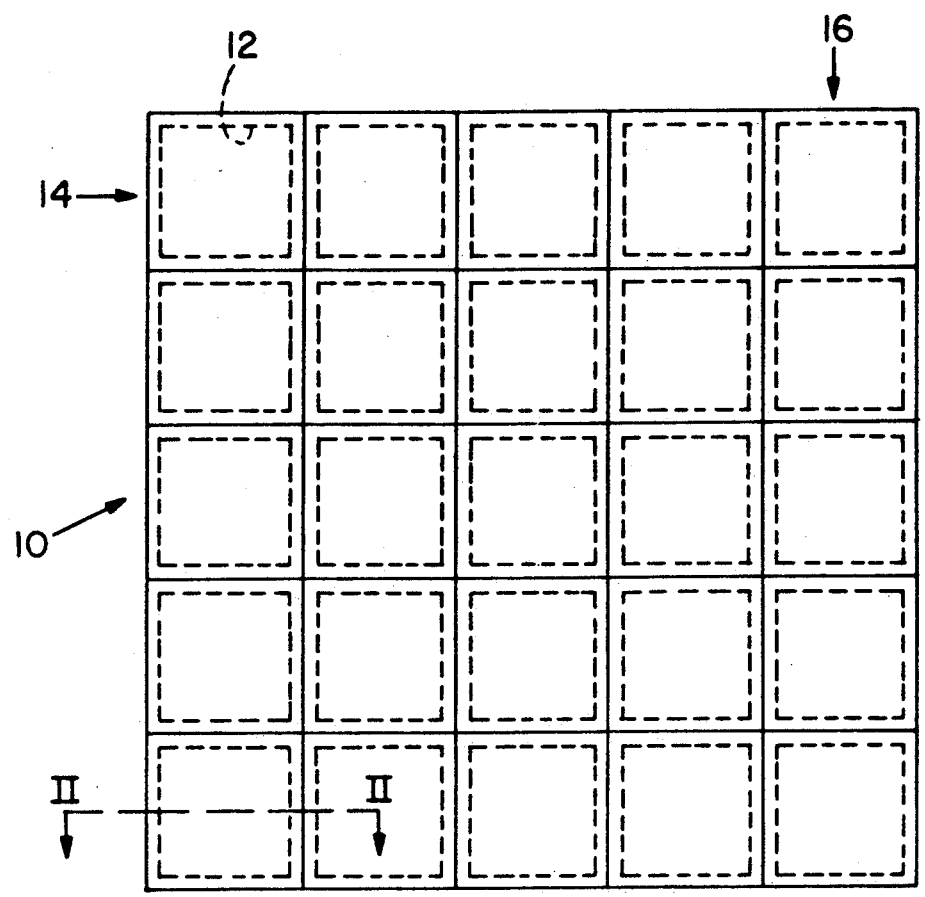
FIG. 1 is a front view of a panel array of the invention.
Figure 2:
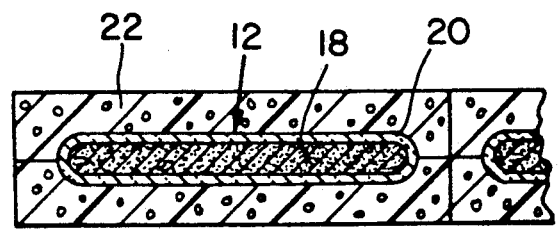
FIG. 2 is a sectional view taken along lines II—II of FIG. 1 of the overall panel array performance.

Referring now to FIGS. 1 and 2, the invention will now be described in detail in connection therewith. An array 10 of evacuated insulation panels 12 is shown in FIG. 1 which consists of N rows 14 and M columns 16. In the embodiment of FIG. 1, $N=M=5$. Each panel consists of an inner core 18 of low thermal conductivity powder, such as fumed silica (Minileit ™, Gruenzweig and Hartmann AG) (Aerosil 380 ® or Cab-O-Sil ®, Cabot Corporation) silica dust (Selma Gray ™, Alabama Met. Corp. or Beverly Fume ™, Interlake, Inc.), fine perlite (Chemrock Corp.), fiberglass and alumina, precipitated silica (FK500LS, Degussa Corp.) or precipitated silica/fly ash mixtures. Each of these materials is considered to be a low conductivity powder. Preferably, such material should have a high thermal resistivity of about 15 or more (h ft² °F./Btu in) at pressure levels in the range of 1/10-10 mm Hg. [See *Advanced Evacuated Thermal Insulators: The State of the Art*, H. Alan Fine (1988)] An outer envelope 20 of low thermal conductivity material which has a low permeability to atmospheric gases encloses the powder. Preferably, this material is glass, such as pyrex ®, C-Glass, Corning low melting point solder glass, or an Owens-Corning Glass fiber mat combined with solder glass or ceramic glaze.

The envelope is evacuated down to a pressure of about 5 mm Hg.

Glass has a thermal conductivity which is 200 times less than aluminum, 40 times less than mild steel and only 3-5 times greater than polymers. In addition, glass has a very low permeability to all gases, except helium.

In the embodiment of FIG. 1, a glass envelope 20 is formed of a glass film 5-15 thousands of an inch thick. Each panel envelope 20 is 5 inches wide and 1 inch thick. This will have an insulating value equivalent to 3.5-4 inch thick closed cell foam. The vacuum elements of this width are preferably enclosed in open cell air filled foam protection covering 22. The foam 22 protects the glass surface from abrasion or sharp objects. If a 5 inch wide envelope 20 is punctured, neighboring vacuum panels will continue to function and the overall impact on the appliance or the building energy efficiency will be minimal.

Figure 3:
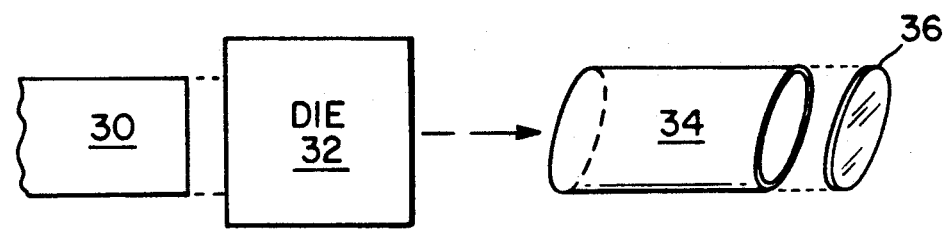
FIG. 3 is a schematic view of a first method for forming panel envelopes in accordance with the invention.

Thin glass sheets for the envelope can be manufactured by continuous extrusion and drawing, as shown in the schematic diagram of FIG. 3. Softened or molten glass 30 is forced through die 32 yielding flattened oval- or elliptical-shaped cylindrical extended glass panel envelopes 34. Alternatively, glass in tubular form may be heated and drawn to the requisite envelope shape 34. Suitable low thermal conductivity powder (not shown) may be co-extruded into the center of the envelope 34, or added later in the process. The extended envelope 34 is cut to the desired length (about 18 inches) and evacuated and sealed at the ends. Molded glass or metallic end caps may be used to seal the ends. Optical clarity and uniform thickness are not necessary, so the sheets should be relatively inexpensive.

Figure 4:
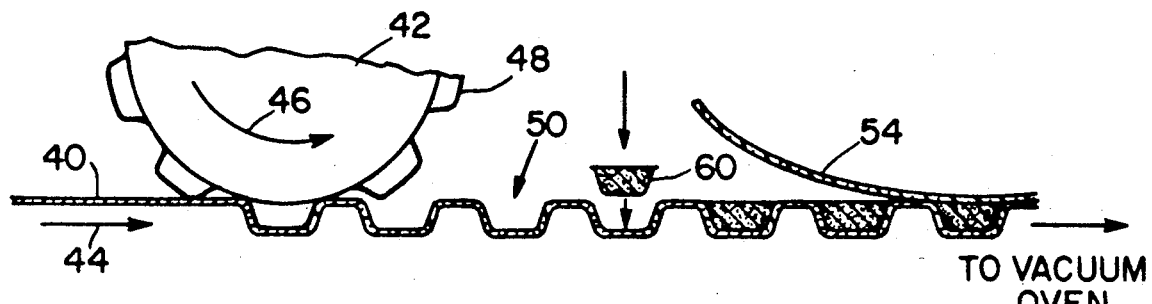
FIG. 4 is a schematic view of a method for forming panels in accordance with the invention.
Figure 5:
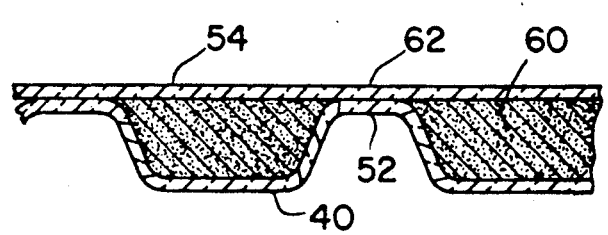
FIG. 5 is a partial sectional view of a panel.
Figure 6:
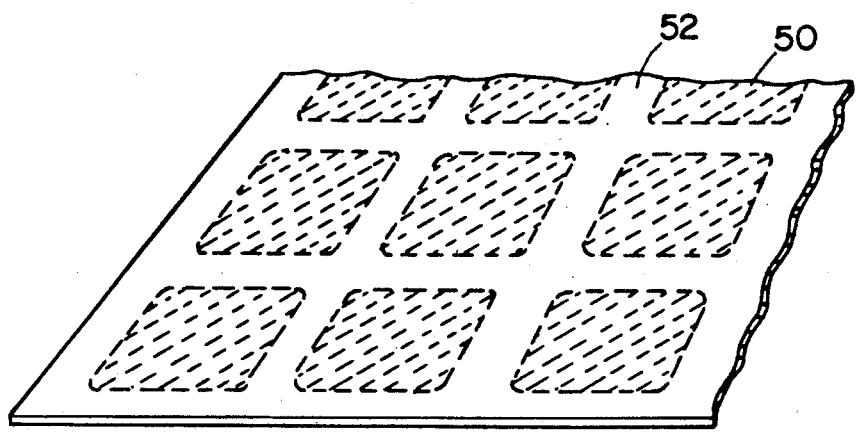
FIG. 6 is a perspective view of a portion of a panel array made in accordance with the FIG. 4 method.

The thin glass envelope has some degree of flexibility; the tightly compacted powder can support the glass without breakage if the glass has the same shape as the powder. The glass can be preformed as it is manufactured, as shown in FIG. 4. In FIG. 4, a hot glass sheet is conveyed past a die 42 in the direction of arrow 44. Die 42 rotates about its axis in the counterclockwise direction indicated by arrow 46. Male molds 48 disposed about the latitude and periphery of cylindrical die 42 create dimples 50, or depressions, in sheet 40 as it passes beneath the die 42. These dimples may be several inches in width or diameter, with a depth up to one or several inches. Surrounding each depression 50 is a flat portion 52 of the sheet, as shown in FIG. 6. The depressions are filled with powder 60, either in loose form, or compressed lightly into the shape of the depression 50. If in loose form, the powder should be compressed after it enters the depression to eliminate any large voids. A second flat sheet of glass 54 is placed over the dimpled sheet 90 forming a cover for the depressions. The resulting sandwich 60 (FIG. 5) is placed in a vacuum oven (not shown) to evacuate the air from the powder 60 and the two glass sheets 54 and 50 are sealed by fusing the adjacent flat surfaces 52 and 62 at elevated temperatures (FIG. 5).

Figure 7:
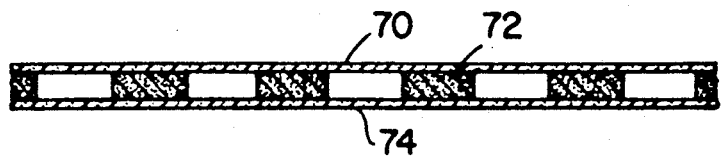
FIG. 7 is a sectional side view of a first step in an alternate method for making the panels of the invention.
Figure 8:
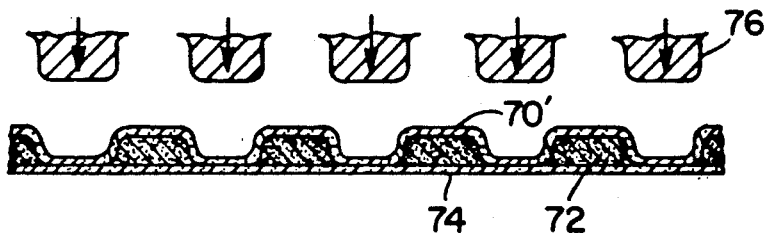
FIG. 8 is a sectional side view of a last step in the process of FIG. 7.

Alternatively, an upper glass sheet 70 can be placed over pellets of compressed powder 72 disposed on a lower glass sheet 74, as shown in FIG. 7. Each pill or pellet 72 may be three or four inches wide and one-half to one inch thick. The sandwich is placed in a vacuum oven (not shown) and the temperature elevated above the glass softening temperature. The glass sheet 72 on top flows around the surface of the pill 72, optionally, with the aid of a mold or fixture 76 applying pressure from above, and joins the sheet 74 on the bottom to form a series of closed surfaces around each individual pill 72, as shown in FIG. 8.

Figure 9:
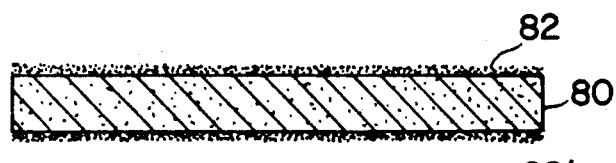
FIG. 9 is a sectional view of a first step in another method embodiment for making the panels of the invention.
Figure 10:
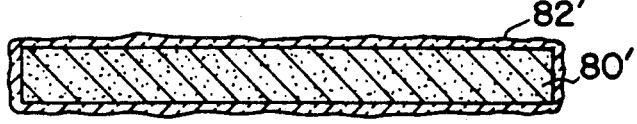
FIG. 10 shows the panel as processed in FIG. 9.

In another embodiment, shown in FIG. 9, the compressed insulating powder shapes or pills 80 may be coated with a ceramic or glass powder 82, such as C-Glass or Corning low melting point solder glass, whose melting point is lower than the softening point of the insulating powder forming the pill 80. The coated shape is heated in a vacuum until the powder on the surface forms a liquid which flows together to form a continuous surface film or glaze 82' to encapsulate the evacuated pill 80' (FIG. 10).

Figure 11:
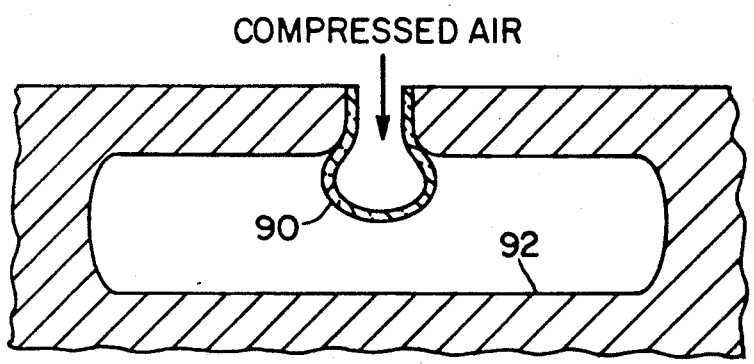
FIG. 11 shows a step in a glass blowing embodiment of the invention.
Figure 12:
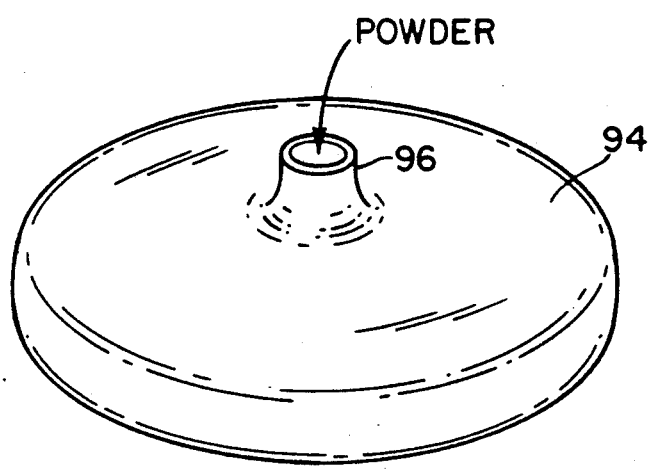
FIG. 12 shows the panel envelope as made per FIG. 11.

As shown in FIG. 11, the glass envelope can be blown into the desired shape much the same way as glass containers are blown by blowing a hot gob of glass 90 into a mold 92 of the desired shape. Possible shapes include flat cylinders 94 four inches in diameter and one inch high with an open filling tube 96 on the top. Another shape is the flattened cylinder described in connection with FIG. 3. Powder (not shown) is added to the container 94 and the container is evacuated with a filter in the neck 96 to retain the particles. The powder compacts as it is evacuated, or can be compacted by vibration. Several successive fillings will achieve complete filling of the glass shape. The filling tube can be sealed by heating and pinching off the tube 96, or by the use of an end cap similar to the base of an incandescent light bulb.

The evacuated panels can be placed in a foam matrix 22 (FIG. 2), or used by themselves. They can be used to insulate appliances or to form part of an insulated building panel. Another possible use of the vacuum panel is as a night insulation for windows. Strips 2.5 inches wide and ¼ inch thick may have an R value of 7 (BTU hrft² °F.)$^{-1}$ when evacuated to a level of 10 mm Hg, or less, and sealed by a glass envelope. These strips could be used in the form of jalousies, or in a flexible roll which can be deployed at night.

The inorganic ceramic envelope evacuated powder panels of the present invention can be made with small widths without causing substantial degradation of thermal performance.

In another embodiment, the powder is enclosed in a five to 10 mil thick nonwoven glass fiber mat, which is porous to air, such as that made by Owens Corning Fiberglas. The powder element enclosed in the mat can be used in the aforementioned processes. Alternatively, the mat can be impregnated with powdered glass, such as Corning low melting point solder glass or powdered C glass, so that when the mat is heated, the powdered glass melts to form with the mat a strong impermeable envelope. The mat and the powdered glass can be combined together before applying around the low conductivity powder, or the low conductivity powder can be encapsulated within the mat, the glass powder applied to the mat surface and the resulting elements placed in a vacuum furnace to evacuate the low conductivity powder and melt the glass powder on the surface of the glass mat. In this process, the glass powder must have a lower melting point than the softening point of the low conductivity powder.

To automate the process, it may be desirable to first heat the powder in loose or compressed form and/or evacuate the powder for enough time to drive off water, gas or vapor-forming materials which are physically trapped or chemically bonded to the particles before the particles are encapsulated in the glass layer. Typically, heating at 212° F. for 24 hours is used for the powder.

If low temperature means are used to seal the glass around the low conductivity powder, it may be advantageous to first evacuate and seal the powder in an inexpensive conventional food packaging which will retain an adequate vacuum, of the order of 1 to 10 mm Hg for a period of several hours to several weeks. This process can be carried out using processes similar to the vacuum packing of foods, such as coffee. This package could be subsequently sealed in a thin glass envelope within hours or days of its manufacture. In sealing this package in glass film, the evacuation could be carried out very quickly.

This completes the description of the preferred embodiments of the invention.

EQUIVALENTS

Those skilled in the art will recognize, or be able to ascertain employing no more than routine experimentation, many equivalents to the specific structures, steps, functions and materials described specifically herein, and such equivalents are intended to be encompassed within the scope of the following claims.

We claim:
1. An evacuated insulation system comprising:
   a) a plurality of panels each comprising:
      (i) an inner core of low thermal conductivity powder;
      (ii) an outer envelope of thin low thermal conductivity, low gas permeable glass material enclosing the powder in an evacuated volume; and
   b) a protective covering of closed cell foam enclosing the panels.
2. The system of claim 3 wherein the panels form an array of N rows and M columns of evacuated panels.
3. The system of claim 2 wherein N and M are greater than one.
4. An evacuated insulation system comprising:
   a) a plurality of panels each comprising:
      (i) an inner core of low thermal conductivity powder;
      (ii) an outer envelope of thin low thermal conductivity, low gas permeable ceramic material enclosing the powder in an evacuated volume; and
   b) a protective covering of closed cell foam enclosing the panels.
5. The system of claim 4 wherein the panels form an array of N rows and M columns of evacuated panels.
6. The system of claim 5 wherein N and M are greater than one.

* * * * *